(12) United States Patent
Swinkels et al.

(10) Patent No.: US 9,124,960 B2
(45) Date of Patent: *Sep. 1, 2015

(54) INTELLIGENT AND SCALABLE ROUTING IN MULTI-DOMAIN OPTICAL NETWORKS

(71) Applicant: Ciena Corporation, Hanover, MD (US)

(72) Inventors: Gerard Leo Swinkels, Ottawa (CA); Darek Skalecki, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,220

(22) Filed: Jun. 30, 2014

(65) Prior Publication Data

US 2014/0314409 A1 Oct. 23, 2014

Related U.S. Application Data

(63) Continuation-in-part of application No. 13/567,154, filed on Aug. 6, 2012.

(30) Foreign Application Priority Data

May 16, 2012 (IN) .......................... 1500/DEL/2012

(51) Int. Cl.
*H04B 10/27* (2013.01)
*H04Q 11/00* (2006.01)
*H04J 3/00* (2006.01)
*H04L 12/24* (2006.01)
*H04L 12/715* (2013.01)
*H04L 12/721* (2013.01)

(52) U.S. Cl.
CPC .............. *H04Q 11/0067* (2013.01); *H04J 3/00* (2013.01); *H04L 41/12* (2013.01); *H04L 45/64* (2013.01); *H04Q 11/0062* (2013.01); *H04L 45/04* (2013.01); *H04L 45/62* (2013.01); *H04Q 2011/0073* (2013.01); *H04Q 2011/0086* (2013.01)

(58) Field of Classification Search
None
See application file for complete search history.

(56) References Cited

U.S. PATENT DOCUMENTS

| 2004/0264371 | A1* | 12/2004 | Chen .............................. 370/229 |
| 2005/0053045 | A1* | 3/2005 | Chmora et al. ................. 370/338 |
| 2009/0274159 | A1* | 11/2009 | Xia et al. ........................ 370/401 |
| 2011/0292832 | A1* | 12/2011 | Bottari et al. .................. 370/254 |
| 2012/0254555 | A1* | 10/2012 | Miwa et al. .................... 711/154 |

* cited by examiner

*Primary Examiner* — Chi H Pham
*Assistant Examiner* — Shick Hom
(74) *Attorney, Agent, or Firm* — Clements Bernard PLLC; Christopher L. Bernard; Lawrence A. Baratta, Jr.

(57) ABSTRACT

A method of extending the control plane to a metro sub-domain for a network having a transport plane for carrying subscriber traffic within end-to-end connections, and a control plane for managing at least a portion of resources of the transport plane allocated to the connections. A first set of control-plane enabled nodes of the network is designated as core nodes, each core node being operable to route subscriber traffic between a pair of neighbor core nodes in the network. A second set of control-plane enabled nodes of the network is designated as metro nodes, each metro node being connected to a core node and operating as a sub-domain of the network. Each core node that is connected to at least one metro node is designated as a host node. The host node is controlled to advertise summary information of its connected metro nodes to other core and metro nodes in the network, thus making it possible to extend control plane function to the metro nodes that can calculate connection routes, set-up/tear-down connections and perform connection failure recovery functions.

20 Claims, 11 Drawing Sheets

INTELLIGENT AND SCALABLE ROUTING
IN MULTI-DOMAIN OPTICAL NETWORKS

CLAIM OF PRIORITY UNDER 35 U.S.C. §120

The present Application for Patent is a continuation-in-part of U.S. patent application Ser. No. 13/567,154, entitled "EXTENDING CONTROL PLANE FUNCTIONS TO THE NETWORK EDGE IN AN OPTICAL TRANSPORT NETWORK," filed Aug. 6, 2012, pending, assigned to the assignee hereof, and expressly incorporated herein by reference in its entirety. The present non-provisional patent also claims the benefit of priority of co-pending Indian Patent Application No. 1500/DEL/2012, filed on May 16, 2012, and entitled "EXTENDING CONTROL PLANE FUNCTIONS TO THE NETWORK EDGE IN AN OPTICAL TRANSPORT NETWORK," the contents of which are incorporated in full by reference herein.

FIELD OF DISCLOSURE

The present application relates generally to management of optical communications networks, and more specifically, to methods of extending control plane functions to the network edge in an optical transport network.

BACKGROUND

FIG. 1A schematically illustrates the logical architecture of an Optical Transport Network (OTN) in accordance with ITU-T recommendation G.8080/Y.1304, entitled Architecture for the Automatically Switched Optical Network (ASON), the entire content of which is incorporated herein by reference. As may be seen in FIG. 1A, the network 2 is logically divided into a transport plane 4 and a control plane 6.

The Transport Plane 4 comprises a plurality of switches 10 interconnected by Physical Interfaces (PIs) 12, and is responsible for transporting subscriber traffic via end-to-end connections provisioned through the network. The Control Plane 6 comprises an Optical Connection Controller (OCC) 14 associated with each switch 10 of the transport plane 4, and is responsible for resource and connection management within the transport plane 4. In the illustrated architecture, one OCC 14 is associated with a respective one switch 10 for clarity. In fact, the ASON permits an OCC 14 to manage multiple switches 10, if desired. Each OCC 14 is connected to its corresponding switch 10 of the transport plane 4 via a Connection Controller Interface (CCI) 16 which enables the respective OCC 14 to implement control plane functionality for its corresponding switch 10. Within the Control Plane 6, the OCCs 14 are interconnected via Network to Network Interfaces (NNIs) 18, and provide a set of network resource and connection management functions. These functions may, for example, include: network topology discovery (resource discovery); address assignment; path computation, connection set-up/tear-down; connection protection/restoration; traffic engineering; and wavelength assignment. Other management functions can be implemented by the control plane 6, as desired.

A physical node of the network will typically incorporate both a Transport Plane switch 10 and its corresponding Control Plane OCC 14, although this is not essential. In some cases, a Transport Plane switch 10 and its corresponding Control Plane OCC 14 may be provided in separate physical machines. For example, the respective OCCs 14 of one or more switches 10 may be hosted on a server (not shown).

Client premised equipment (CE) 20, which may be a server or a router, for example, can send and receive packets that contain information for both the Transport Plane 4 and the Control Plane 6. For this purpose, the CE may be connected to a switch 10 of the Transport Plane 4 via a PI 12, and to its corresponding OCC 14 via a User Network Interface (UNI) 22.

FIG. 1B presents a simplified view of the network architecture of FIG. 1A, in which the switches 10 and their associated OCCs 14 are represented by network nodes 24 connected by inter-node links 26 (each of which includes a PI 12 and its corresponding NNI 18). Similarly, the CE 20 is represented as being connected to a network node 24 via an access link 28 which, in the illustrated embodiment, includes a PI 12 and a UNI 22.

Referring to FIG. 2, it is customary to extend the architecture of FIG. 1B to implement access gateways (AGs) 30 between the CEs 20 and the network 2. An access gateway 30 may also be referred to as an access server or an aggregation server. The function of the access gateway 30 is to provide an interface between one or more CEs 20 and the network 2. Among other things, an AG 30 enables a service provider to aggregate traffic flows to and from multiple CEs 20, which increases the number of CEs 20 that can access the network 2, while making better use of the bandwidth capacity of the access links 28 to the network 2. The use of an AG 30 also simplifies the implementation of dual-homed connections to the network 2, which has a benefit of removing a single point of failure in the path to and from the CEs 20. In the example of FIG. 2, AG-1 is dual homed to the network 2 via respective access links 28 to network nodes A and B, while AG-m is single-homed to the network 2 via an access link 28 to node B.

It would be desirable to extend the control plane 6 to include the AGs 30. This would be beneficial in that, among other things, each AG 30 would then be able to participate in topology discovery, path computation, connection set-up/tear-down and failure recovery functions offered by the OTN control plane 6. As is known in the art, topology discovery requires the exchange of link state messages between each of the OCCs 14 of the control plane 6, and the use of such state messages to accumulate a respective topology database for each OCC 14. Such topology database can then be used by an OCC 14 to compute connection routes through the network 2. Open Shortest Path First (OSPF) is a well-known protocol which defines various types of Link State Advertisement (LSA) messages that may be used for this purpose. Other protocols are also known, which also use inter-OCC messaging for topology discovery and route computation. For ease of description in this application, explicit reference will be made to LSA messages, it being understood that such references are also intended to encompass other message types and protocols that may be used in the control plane to implement topology discovery and route computation functions for the network 2.

In a full-mesh network, both the volume of LSA traffic and the size of the topology database increases with $N^2$, where N is the number of nodes participating in the control plane 6. In a network environment in which there are a large number of AGs 30, extending the control plane 6 to include the AGs 30 can lead to a proliferation of LSA traffic and require a very large topology database, both of which may degrade the topology discovery, route computation, and failure recovery functions of the control plane 6.

Techniques that enable extension of the OTN control plane 6 without unduly degrading control plane performance remain highly desirable.

SUMMARY

An aspect of the present disclosure provides a method of extending control plane functions to the network edge in an optical transport network having a transport plane for carrying subscriber traffic within end-to-end connections, and a control plane for managing at least a portion of resources of the transport plane allocated to the connections.

An exemplary embodiment provides a method for resource and connection management in a network with a core domain and at least one metro domain in communication with the core domain. The exemplary embodiment may include designating a first set of control-plane enabled nodes of the core domain as core nodes, each core node being operable to route subscriber traffic between a pair of neighbor core nodes in the core domain; designating a second set of control-plane enabled nodes of a metro domain as metro nodes, each metro node being operable to route subscriber traffic between a pair of neighbor metro nodes in the metro domain; designating a core node that is connected to a metro node as a host node; assigning summary information to each metro node; and advertising the summary information to core nodes in the network.

BRIEF DESCRIPTION OF THE DRAWINGS

The accompanying drawings are presented to aid in the description of embodiments of the invention and are provided solely for illustration of the embodiments and not limitation thereof. Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
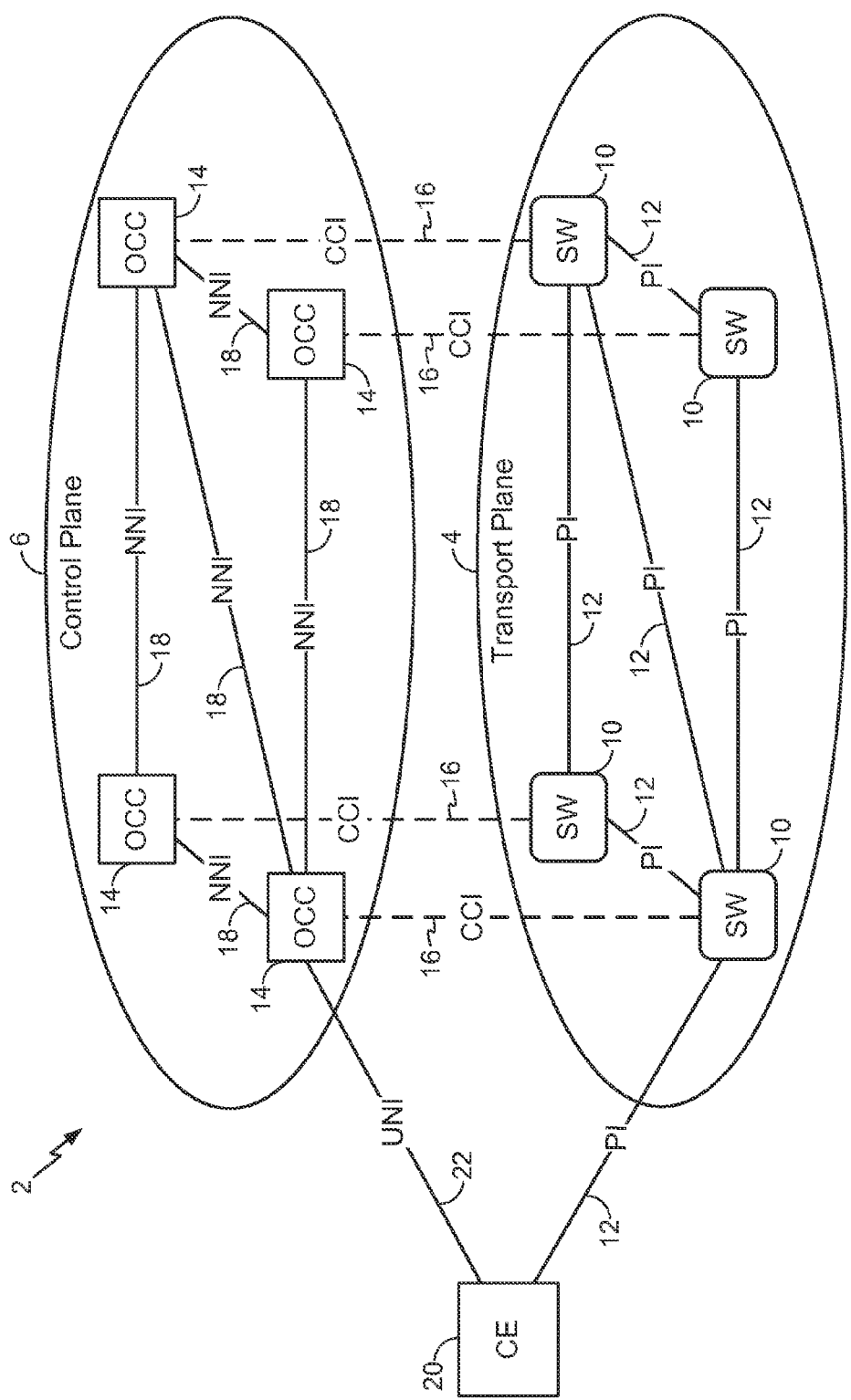
FIGS. 1A and 1B are block diagrams schematically illustrating the logical structure of an Automatically Switched Optical Network (ASON) known in the prior art.
Figure 1B:
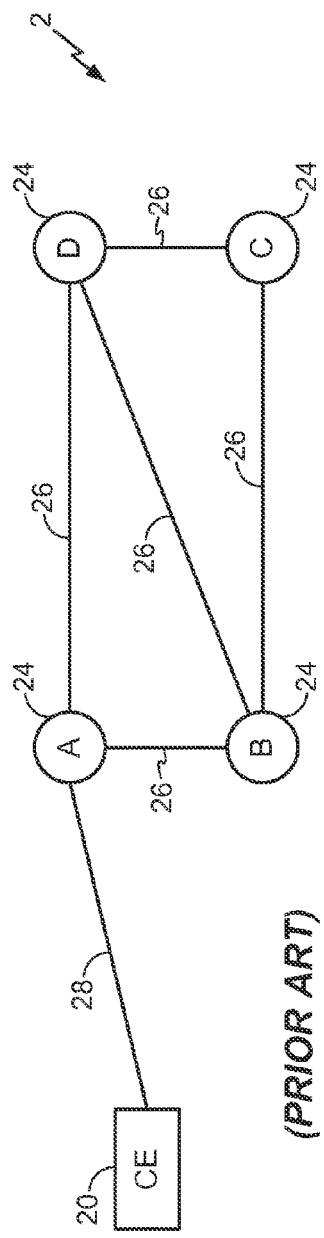

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

For the purposes of the present disclosure, a distinction is made between the core nodes and tail nodes, based on the type of transport plane traffic forwarding that can be supported by each node. For the purposes of the present disclosure, a "core node" is considered to be a node through which transport plane traffic can be routed between two adjacent core nodes. The set of core nodes within the network may be taken together as defining a "core network" or, equivalently, a "network core". In contrast, a "tail node" is considered to be a node that cannot operate to route transport plane traffic between two adjacent core nodes, but rather is limited to sourcing (and sinking) traffic to (and from) the network and routing traffic between its directly subtending CEs. In addition to these definitions, it is convenient to identify each core node through which a tail node may obtain access to the network. Such core nodes may be referred to as "host nodes".

Figure 2:
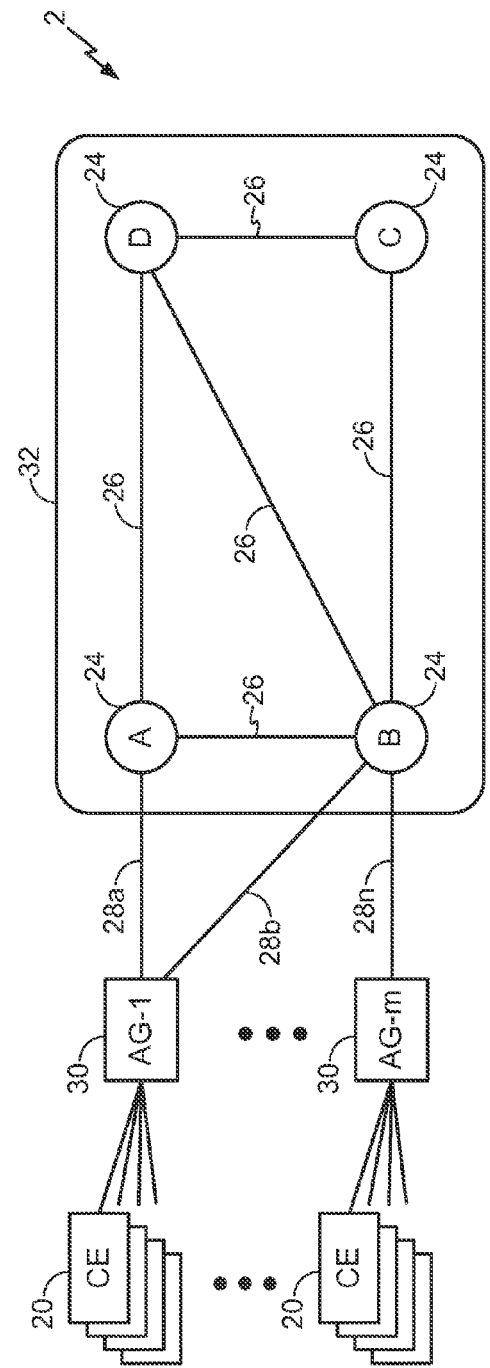
FIG. 2 is a block diagram schematically illustrating extension of the ASON structure of FIG. 1A to include access gateways between the ASON and Customer premised equipment.

In the example of FIG. 2, each node 24 represents a core node, because it can route subscriber traffic between two neighbor core nodes 24 within the core network 32. For example, node A can route subscriber traffic between neighbor (core) nodes D and B. On the other hand, each AG 30 is an example of a tail node, because it only operates to forward traffic between its connected CE(s) 20 and a core node 24 of the network 2. As such, an AG 30 can only source (and sink)

subscriber traffic flows into (and from) the network 2, or route subscriber traffic flows between two CEs 20 connected to it Even in the case of dual homed AG-1, subscriber traffic cannot be routed between neighbor (core) nodes A and B (e.g. via access links 28a and 28b). Any traffic arriving at AG-1 from core node A, for example, must either be passed to a CE 20, or must be dropped; it cannot be forwarded to core node B.

It should be noted that tail nodes are not limited to AGs 30 hosting CEs 20. A tail node can be any node that operates solely to source and sink transport plane traffic to and from the network 2. Thus, for example, a CE 20 which is directly connected to a core node 24 can be treated as a tail node, if desired. Similarly, a gateway between two networks (or subnetworks) can be a tail node if it serves only as a transit point for traffic flows originating in one network, and terminating in the other network (and so is seen as a traffic source or sink in any given one of the involved networks).

As may be appreciated, the distinction between tail nodes and core nodes is based on the role that each node plays in the network, rather than its physical construction or location. Thus it is possible for a tail node and a core node to be physically identical, if desired, in which case the difference between the two types of nodes would lie in their respective control software. Similarly, there is no requirement for core nodes and tail nodes to be installed at geographically dispersed locations, although it is contemplated that this will normally be the case.

In a conventional Optical Transport Network (OTN) in accordance with ITU-T recommendation G.8080/Y.1304, the span of the control plane 6 is limited to core nodes, so that the control plane 6 can provide (inter alia) topology discovery, route computation, connection set-up/tear-down and protection/restoration functions for subscriber traffic flows within the network. Because the number of tail nodes can be very large (e.g. reaching 10000 or more in a large network), tail nodes are excluded from the control plane 6, so as to avoid proliferation of control plane messaging and exponential growth of control plane messaging and topology databases, both of which may tend to degrade control plane performance.

The Applicants have discovered that the control plane 6 can be extended to provide control plane functionality to tail nodes, by implementing conventional OCC functionality in each tail node, and suitably controlling the size and propagation of LSAs through the host nodes.

Figure 3:
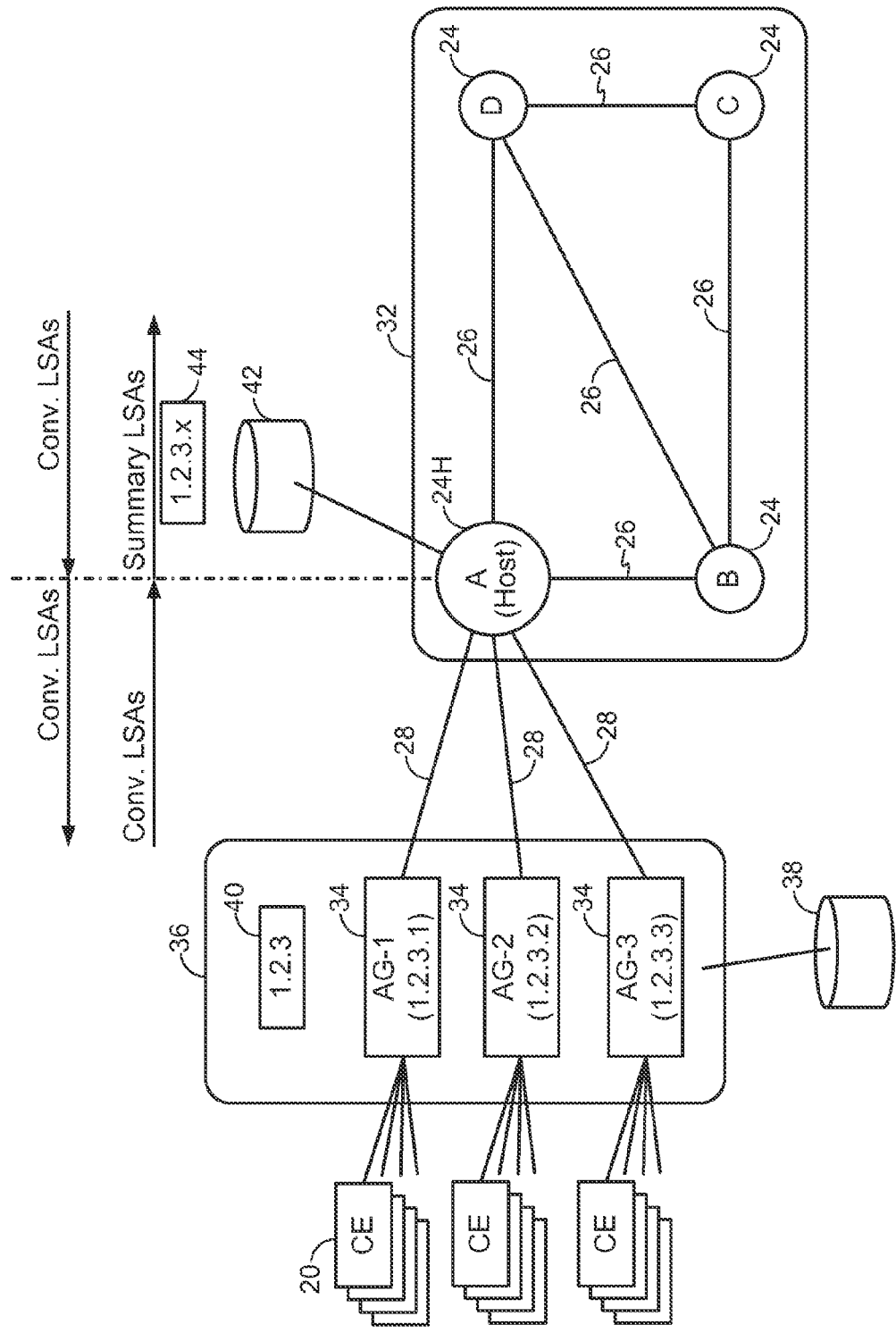
FIG. 3 is a block diagram schematically illustrating a network implementing a first representative embodiment of the present invention.

Referring to FIG. 3, there is shown a representative embodiment in which a set of three control-plane enabled tail nodes 34 (AG-1, AG-2 and AG-3) are logically associated with an area 36 and connected to a host node 24H via respective access links 28. A topology database 38 associated with the area 36 is populated with topology information of the network 2, and thus can be used in a conventional manner to enable the tail nodes 34 to compute end-to-end routes through the network 2 using conventional methods. Typically, the topology database 38 used by a given control plane enabled tail node 34 is maintained by the OCC 14 associated with that tail node 34. Where two or more tail nodes 34 are managed by a common OCC 14, those tail nodes 34 will share a common topology database 38. On the other hand, when tail nodes 34 are not managed by a common OCC 14, then each tail node 34 will utilize its own topology database 38.

The set of tail nodes 34 may be geographically dispersed or may be physically co-located, as desired. In the case of geographically dispersed tail nodes 34, each tail node 34 may maintain a respective instance of the topology database 38. On the other hand, co-located tail nodes 34 may share a common instance of the topology database 38, if desired.

Connections over the access links 28 between tail nodes 34 and the host node 24H may utilize either User-Network-Interface (UNI) or Network-Network-Interface (NNI) connections in the control plane, as desired.

The logical allocation of tail nodes 34 to the area 36 may be based on any suitable criteria. In the embodiment of FIG. 3, the chosen criterion is connection to the host node 24H, such that the area 36 encompasses all of the tail nodes 34 connected to the host node 24H. Other criteria may be used, as will be apparent from the following description.

The area 36 is preferably referenced using a unique area identifier 40, which may be defined in any suitable manner. In the embodiment of FIG. 3, the area identifier 40 is derived from respective addresses of the involved tail nodes 34. In particular, the area 36 encompasses three tail nodes 34, namely AG-1, AG-2 and AG-3, whose addresses are "1.2.3.1", "1.2.3.2" and "1.2.3.3", respectively. All of these addresses contain a common prefix portion "1.2.3", which may conveniently be used as the area identifier 40 as shown in FIG. 3. In an alternative embodiment, the area identifier 40 may be derived from the respective address of the host node 24H. Since every core node 24 in the network has a unique network address, derivation of the area identifier 40 from the host node address enables the host node 24H or a management server (not shown) in communication with the host node 24H to independently derive an area identifier 40 that is unique within the network 2. This arrangement is advantageous in that it eliminates the need for a network service provider to manually provision area identifiers 40 while at the same time ensuring that each area identifier 40 is unique across the network 2.

The host node 24H is preferably provided with a network topology database 42. The network topology database 42 may be populated in a convention manner based on LSAs received by the host node 24H from the other core nodes 24 in the network 2, and so may be used in a convention manner for computation of routes through the network 2. As will be described in greater detail below, the network topology database 42 may also be populated based on LSAs received from the tail nodes 34 connected to the host node 24H, and used to enable computation of routes between the host node 24H at its attached tail nodes 34.

It is a simple matter to implement OCC functionality for each tail node 34, which thereby enables the upgraded tail node 34 to participate in the control plane 6. Consequently, each upgraded (i.e. control-pane enabled) tail node 34 is capable of exchanging LSAs with its connected host node 24H, populate its topology database 38, and compute routes through the network 2 in a conventional manner.

The host node 24H is configured (for example operating under suitable software control) to implement different LSA forwarding rules, for example depending on whether LSA messages are received from one of its attached tail nodes 34 or from neighboring core nodes 24 in the network 2.

In some embodiments, LSAs received by the host node 24H from a neighboring core node 24 are forwarded to its attached tail nodes 34 in a conventional manner. With this arrangement, a tail node 34 will receive LSAs originating from core nodes 24 in the network 2, and so can populate its topology database 38 with information enabling it to calculate end-to-end routes through the network 2.

In other embodiments, LSAs received by the host node 24H from a neighboring core node 24 are not forwarded to its attached tail nodes 34. With this arrangement, tail nodes 34 are not capable of calculating end-to-end routes through the network 2, and must therefore interact with the host node 24H to calculate end-to-end routes through the network 2. Known techniques such as, for example Path Computation Element (PCE) and loose hop routing mechanisms may be used for this purpose.

On the other hand, LSAs received by the host node 24H from its attached tail nodes 34 are not propagated into the network 2 in a conventional manner, but rather are used to derive summary information which is then advertised into the network 2. The advertisement of summary information enables other nodes in the network 2 to populate their topology databases and compute end-to-end routes through the network 2, while at the same time limiting the propagation of tail node originated LSAs into the network 2.

In some embodiments, the summary information advertised by the host node 24H comprises a summary address 44 which is based on the area identifier 40 of the area 36 to which each tail node 34 is allocated.

For example, in the embodiment of FIG. 3, the summary address 44 is a four byte address comprising the three-byte area identifier 40 "1.2.3" concatenated with a one byte suffix portion populated with wildcard character ("x" in FIG. 3) to define a four-byte address that summarizes the respective addresses of the tail nodes 34. Alternatively, the summary address may be comprised of only the three-byte area identifier 40 "1.2.3", since the wildcard suffix is implicit. Advertisement of the summary address 44 into the network 2 by the host node 24H ensures that connections destined for any of one of the tail nodes 34 will be routed through the host node 24H.

As may be appreciated, each tail node 34 will be represented in the network 2 by a respective tail node address that conforms to the summary address 44, but with the suffix portion populated with a node identifier that uniquely identifies a respective tail node 34 within its area 36.

For ease of compatibility with link state messaging protocols being used in the network 2, it is convenient to define the format of the summary address 44 in conformance with the addressing scheme of the network 2. However, this is not essential. In general, any address format that enables the summary address 44 to be advertised into the network 2, and which enables computation of routes to desired tail nodes 34 may be used. For example, other summarizable area identifier formats that can be used include those based on IPv6 or Network Service Access Point (NSAP).

As may be appreciated, the advertisement of summary address information into the network 2 by the host node 24H means that a single LSA message and topology database entry can be used to represent a plurality of tail nodes 34, thereby reducing control plane messaging relative to conventional methods. A further reduction in control plane messaging can be obtained by limiting the frequency with which the host node 24H advertises changes in the state affecting its tail nodes 34. In particular, under conventional control plane protocols, any change in state affecting a node immediately triggers a corresponding LSA message notifying the other nodes of the change. However, because tail nodes 34 are not critical for traffic routing in the network 2, the host node 24H may defer advertising tail node 34 state changes into the network 2.

In some embodiments, the host node 24H may advertise the state affecting its connected tail nodes 34 on a predetermined schedule, such as, for example once every half hour. Thus, for example, the host node 24H may accumulate information of state changes affecting its tail nodes 34 during a given interval of time, and then generate a single LSA message containing a summary of changes accumulated during that interval, or simply the latest states affecting the tail nodes 34.

In some embodiments, the host node 24H may advertise the state affecting its connected tail nodes 34 after a predetermined number of changes have occurred. Thus, for example, the host node 24H may accumulate information of state changes affecting its tail nodes 34 until a predetermined number of state changes have been recorded, and then generate a single LSA message containing a summary of the accumulated state changes, or simply the latest states affecting the tail nodes 34.

Figure 4:
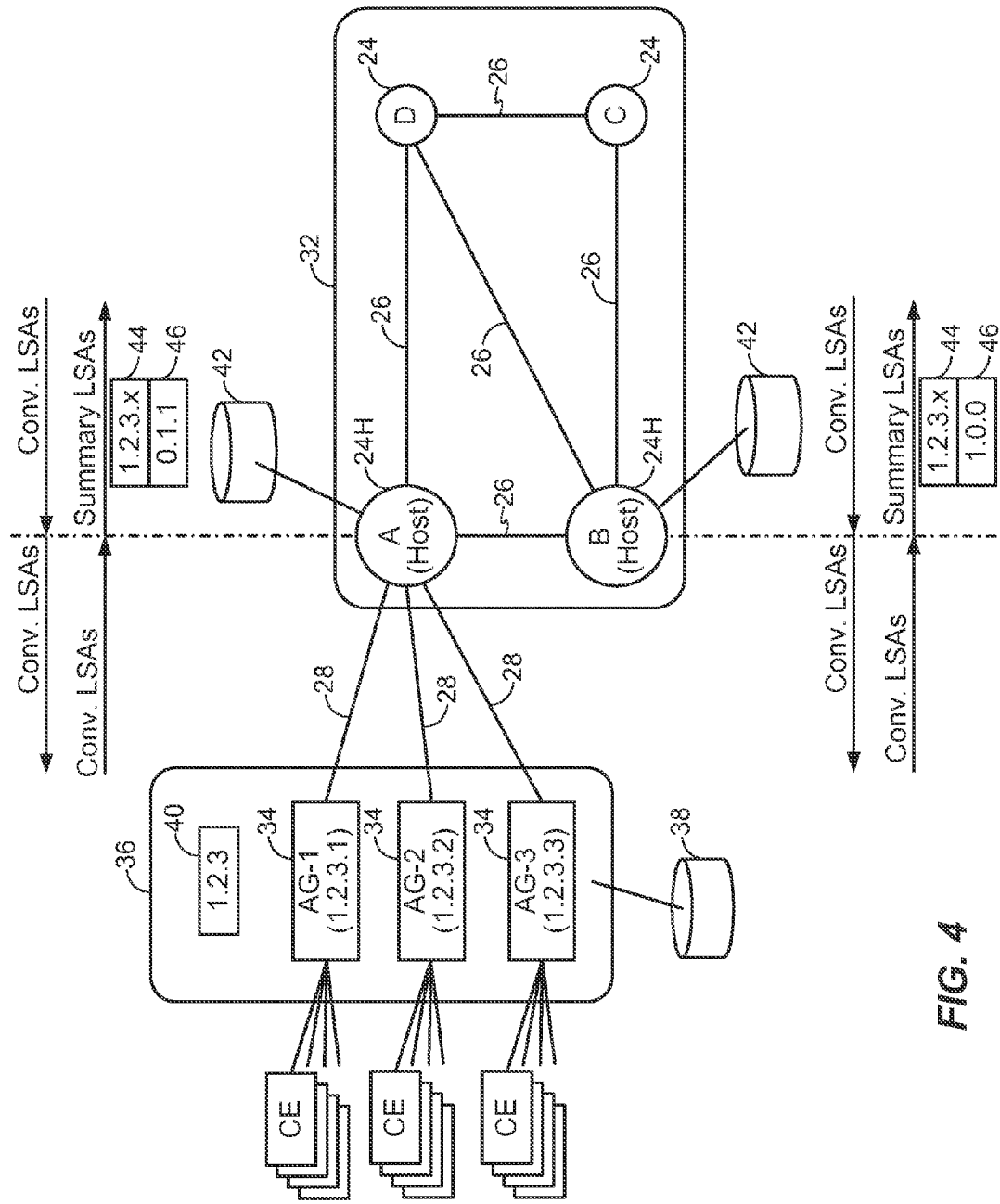
FIG. 4 is a block diagram schematically illustrating a network implementing a second representative embodiment of the present invention.

In the embodiment of FIG. 3, each of the tail nodes 34 is single-homed on core node A, acting as host node 24H. FIG. 4 illustrates an embodiment in which the tail nodes 34 are dual-homed on host nodes A and B of the network 2. Both of the host nodes 24H can operate in a manner similar to that described above to advertise summary information of their attached tail nodes 34 into the network 2. However, in embodiments in which the area identifier 40 is automatically derived by the host node 24H, the algorithm implemented in each host node 24H should operate to ensure that a single area identifier 40 is adopted and used by both host nodes 24H, so that each tail node 34 is consistently identified in the network 2. In embodiments in which the area identifier 40 is derived from the tail node addresses, this result will automatically be obtained simply by implementing the same algorithm in each host node 24H.

Additionally, for each tail node 34, one of the access links 28 may be disabled or blocked in a known manner. In FIG. 4, this disabled/blocked state is indicated by an "X" in each of the affected access links 28. Thus, in the example of FIG. 4, tail node AG-1 is currently connected to the network 2 via its access link 28 to core (host) node B, while tail nodes AG-2 and AG-3 are currently connected to the network 2 via their respective access links 28 to core (host) node A. It would be desirable to efficiently advertise this connectivity information to other nodes in the network 2.

One method by which the host nodes 24H can advertise connectivity information is to define a connectivity vector 46, which may take the form of a binary sequence in which each bit position represents a respective one of the tail nodes 34 in the area 36, and the binary value of that bit position represents whether or not that tail node 34 can be reached through the advertising host node 24H. In use, each host node 24H can derive a respective connectivity vector 46 based on the status of its inter-connecting links 28 to each tail node 34 in a given area 36, and advertise the connectivity vector 46 along with the address summary 44 described above. Based on this information, other nodes in the network 2 can determine which of the host nodes 24H can be used to reach a desired tail node 34, and so compute routes to the desired tail node 34 via the appropriate one of the host nodes 24. In the example of FIG. 4, host node A advertises summary information 44 comprising summary address 44 "1.2.3.x" and connectivity vector 46 "0.1.1", indicating that tail node addresses "1.2.3.2" and "1.2.3.3" (i.e. "1.2.3.x"; where x=2 and x=3) can be reached via host node A. Conversely, host node B advertises summary information comprising summary address 44 "1.2.3.x" and connectivity vector 46 "1.0.0", indicating that tail node address "1.2.3.1" (i.e. "1.2.3.x"; where x=1) can be reached via host node B. By this means, other nodes in the network 2 can use the summary information to identify the host node 24 through which a desired tail node 34 can be reached, and compute a route through the network 2 to the desired tail node 34 through that host node 24.

This approach is beneficial in that it increases the likelihood that routes can be successfully set up to desired tail nodes 34 on the first attempt, and thereby avoid undesirable control plane signaling associated with trying to find the appropriate host node 24 through which to route by "trial and error", at a cost of advertising only one additional bit for each tail node 34 in a given area 36 and the summary area identifier 40.

In some embodiments, each bit position of the connectivity vector 46 may be resolvable to determine the tail node address of a corresponding tail node 34. In the example of FIG. 4, the area identifier 40 "1.2.3" can be combined with the bit position of the connectivity vector 46 to obtain the tail node address of a specific one of the tail nodes 34. Thus resolved, the tail node address can be used to calculate a route and set up a connection through the network 2 to the appropriate host node 24, which can then use the tail node address to extend the connection through to the appropriate one of the tail nodes 34.

In the foregoing examples, an area identifier 40 is used as a means to reference a set of one or more associated tail nodes 34 in the network 2. In some embodiments, the association between the tail nodes 34 may simply be that they are connected to a given host node 24. Alternatively, areas may be defined such that all of the tail nodes 34 within a given area 36 (and so assigned a given area identifier 40) have identical connections to the network 2. Thus for example, the set of tail nodes 34 single homed on one host node 24 shown in FIG. 3 may be assigned to a first area 36, while the set of tail nodes 34 dual-homed on host nodes 24A and B in FIG. 4 may be assigned to a second area 36. With this arrangement, a differentiation can be made between single-homed and dual-homed tail nodes 34, which may, for example, be treated differently. For example, the use of a connectivity vector 46 is primarily useful for dual-homed tail nodes 34. Thus, in some embodiments, the summary information advertised by a host node 24 may only include the connectivity vector 46 for those tail nodes 34 that are dual homed.

In the foregoing examples, the connectivity vector 46 is provided as a binary sequence in which each bit position represents a respective one of the tail nodes 34 in the area 36, and the binary value of that bit position represents whether or not that tail node 34 can be reached through the advertising host node 24H. This arrangement is beneficial in that it facilitates route computation with minimal overhead, as noted above. However, in some cases, it may be desirable to advertise connectivity information with a finer granularity than is possible with a single bit. Accordingly, if desired, the connectivity vector 46 may be formatted such that each tail node 34 is associated with a respective set of two of more bit positions, which may be used alone or in combination to convey information regarding connectivity between the advertising host node 24 and the involved tail node 34.

For example, consider a network in which access links 28 may be configured in any one of four different bandwidths, including: zero (i.e. no bandwidth); Optical channel Data Unit (ODU)-0 (i.e. 1.24416 Gbit/s); ODU-1 (i.e. 2× ODU-0 or approximately 2.49877 Gbit/s); and ODU-2 (i.e. 4× ODU-1 or approximately 10.03727 Gbit/s). This connectivity information may be conveyed by a connectivity vector 46 formatted to provide a set of two bit positions for each tail node 34, with the binary value represented by the 2-bit set indicating a respective one of the four possible bandwidth states of the access link 28 between the advertising host node 24 and the relevant tail node 34. Thus, for example, a value of "00" may indicate that the respective tail node 34 is not reachable; a value of "01" may indicate that the respective tail node 34 is reachable for connections up to an ODU-0 bandwidth; a value of "10" may indicate that the respective tail node 34 is reachable for connections up to an ODU-1 bandwidth; and a value of "11" may indicate that the respective tail node 34 is reachable for connections up to an ODU-2 bandwidth. Other formats of the connectivity vector 46 and the meanings will become apparent to those of ordinary skill in the art, and may be used without departing from the intended scope of the appended claims.

Based on the foregoing description, it will be seen that the present technique utilizes a summary address 44 and connectivity vector 46 to advertise reachability of tail nodes 34 in the network. This arrangement offers numerous benefits over the conventional mechanisms by which information about tail nodes 34 and links 28 inter-connecting tail nodes 34 and host nodes 24 may be advertised in the network 2. More particularly, if it was desired to advertise information about tail nodes 34 and access links 28 in the conventional manner then: a) each tail node 34 would advertise a Nodal LSA. At minimum this includes the address of the tail node 34 which is similar in size to the summary address 44, i.e. 4 bytes; and b) For each link 28 inter-connecting a tail node 34 to a host node 24, the tail node 34 would advertise a Link LSA, and the host node 24 would advertise a Link LSA also. Information in both Link LSAs would be pretty much the same (except local and remote information would be reversed) and such information can easily reach 100 bytes in some implementations (e.g.: OSPF-TE). So, in conventional methods, for each tail node 34 there would be advertisement of one Nodal LSA and two Link LSAs per each link 28 interconnecting tail node 34 to host node 24. If tail nodes 34 are interconnected to host nodes 24 via many links 28 then 2 Link LSAs are advertised per each link 28.

By contrast, in the present technique, these three (or more) LSAs are replaced by a single summary address 44 and a connectivity vector 46. In practice, the summary address 44 advertised by the host node 24 is approximately equivalent in size to a single Nodal LSA, but a savings is obtained in that a single summary address 44 is advertised representing N tail nodes 34. Further (and significant) savings are obtained by replacing the two (or more) link LSAs with a connectivity vector 46 comprising a single bit (or a set of two or more bits for more granular information) for each tail node 34.

Information in conventional Link LSAs includes bandwidth availability on the link, link's attributes such as admin weight or cost, its color or resource class, and many other attributes typically used in the route computation to enable appropriate steering/discrimination of routes. For example, a link's admin weight or cost is conventionally used to calculate the most optimal (cheapest) end-to-end route of a connection. However, the present Applicants have recognized that links 28 inter-connecting tail nodes 34 and host nodes 24 must always be used by the tail node 34 to gain access to the core network 32 and thus cannot be avoided/discriminated. For example, if the cost of using a given tail-to-host link 28 is X dollars then the cost of an end-to-end route to the tail node 34 attached to that link must be at least X dollars, independently of the route taken through the core network 32. Therefore, link attributes such as cost are of limited value for links 28 between tail 34 and host 24 nodes, as such links 28 are not used to tandem traffic/connections not destined for the particular inter-connected tail node 34, and must always be used to gain access to the core network 32.

Figure 5:
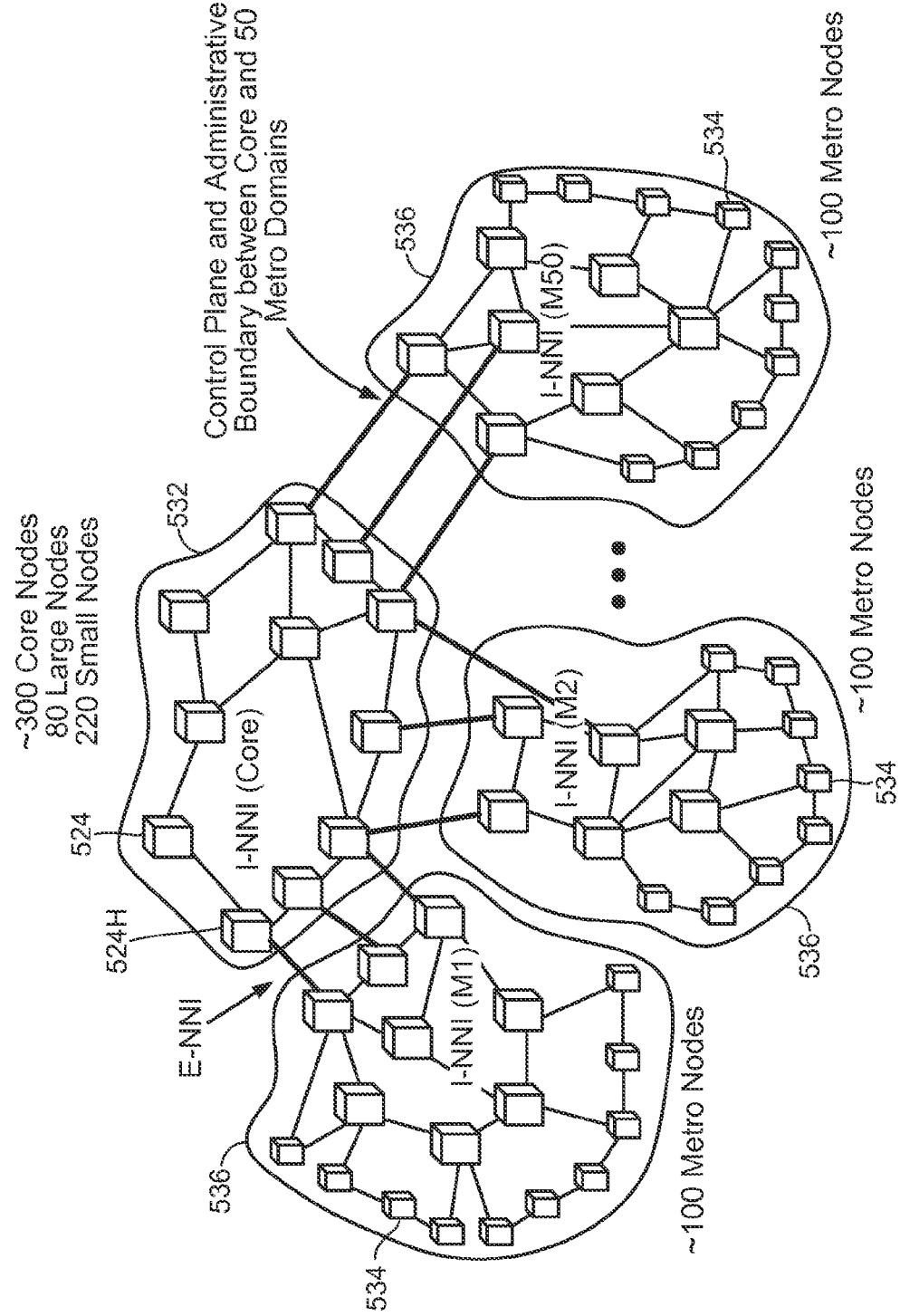
FIG. 5 is a block diagram depicting an exemplary embodiment of the disclosure of a core network connected to a plurality of metro networks.

FIG. 5 depicts an exemplary embodiment of the disclosure. As shown in FIG. 5, a core network 532 may be connected to a plurality of metro networks 536. The core network may include a plurality of core nodes 524 that route subscriber traffic between two neighbor core nodes 524 within the core network 532. Each metro network 536 may include a plurality of metro nodes 534. The metro networks 536 communicate with core network 532 to pass traffic between the metro domains and the core similar to tail nodes and core nodes noted above.

As may be appreciated, the distinction between metro nodes and core nodes is based on the role that each node plays in the network, rather than its physical construction or location. Thus it is possible for a metro node and a core node to be physically identical, if desired, in which case the difference between the two types of nodes would lie in their respective control software. Similarly, there is no requirement for core nodes and metro nodes to be installed at geographically dispersed locations, although it is contemplated that this will normally be the case.

The Applicants have discovered that the core control plane 6 can be extended to provide control plane functionality to metro nodes, by implementing conventional OCC functionality in each metro node, and suitably controlling the size and propagation of LSAs through the host nodes.

Figure 6:
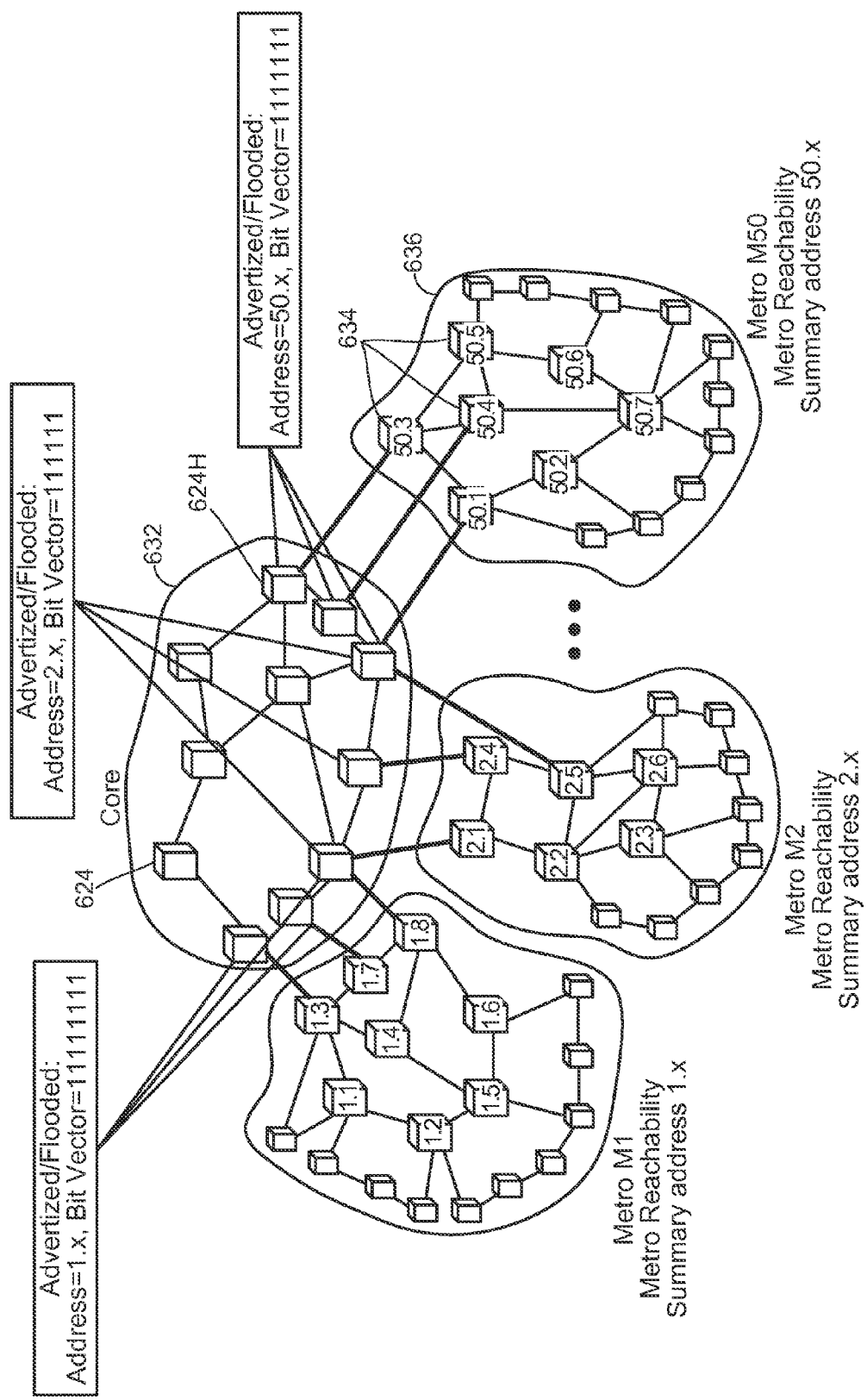
FIG. 6 depicts an exemplary embodiment showing a unique metro network identifier.

FIG. 6 depicts an exemplary embodiment. For example, the metro reachability is shown in FIG. 6. The metro network 636 is preferably referenced using a unique metro network identifier, which may be defined in any suitable manner. For example, a unique Prefix.Suffix address may be assigned to each Metro Node, e.g.: 1.1 or 5.3, such that all nodes in the same metro have the same Prefix. The suffixes may be sequential. All nodes 634 in a metro can be summarized by a Metro Reachability Summary Address of Prefix.x, e.g.: 1.x, 5.x, etc. Each Core Node 624 connecting to a metro 636 is that metro's Home Node 624H.

Home Nodes 624H may flood Metro Reachability Summary Addresses and optionally a Metro Reachability Bit Vector to indicate reachability to a particular Metro Node 634.

One bit may indicate Reachable versus Non-Reachable nodes. More bits may be defined to represent the cost of reachability and for which payload sizes, etc. If a Metro Reachability Bit Vector is not flooded or contains insufficient detail/granularity then a PCE like mechanism may be used for path computations, otherwise each Metro Node 634 can calculate its own routes. Home Nodes 624H do not flood metro's 136 topology (nodes+links) into Core 632, while Core nodes 624 do flood their topology into metros 636.

Routing Scalability—each Core Node 624 may know only the detailed topology of the Core 632 and Metro Reachability Summary Addresses for all Metros 636 and optionally may also know the Metro Reachability Bit Vectors. Each Home Node 624H may know the detailed topology of the Core 632 and its Metro 636, and Metro Reachability Summary Addresses of all other Metros 636 and optionally may also know the Metro Reachability Bit Vectors. Thus, Routing Topology Databases associated with the networks contains no more than few hundred nodes instead of thousands of nodes if the entire network was treated flat as a single area/domain.

Figure 7:
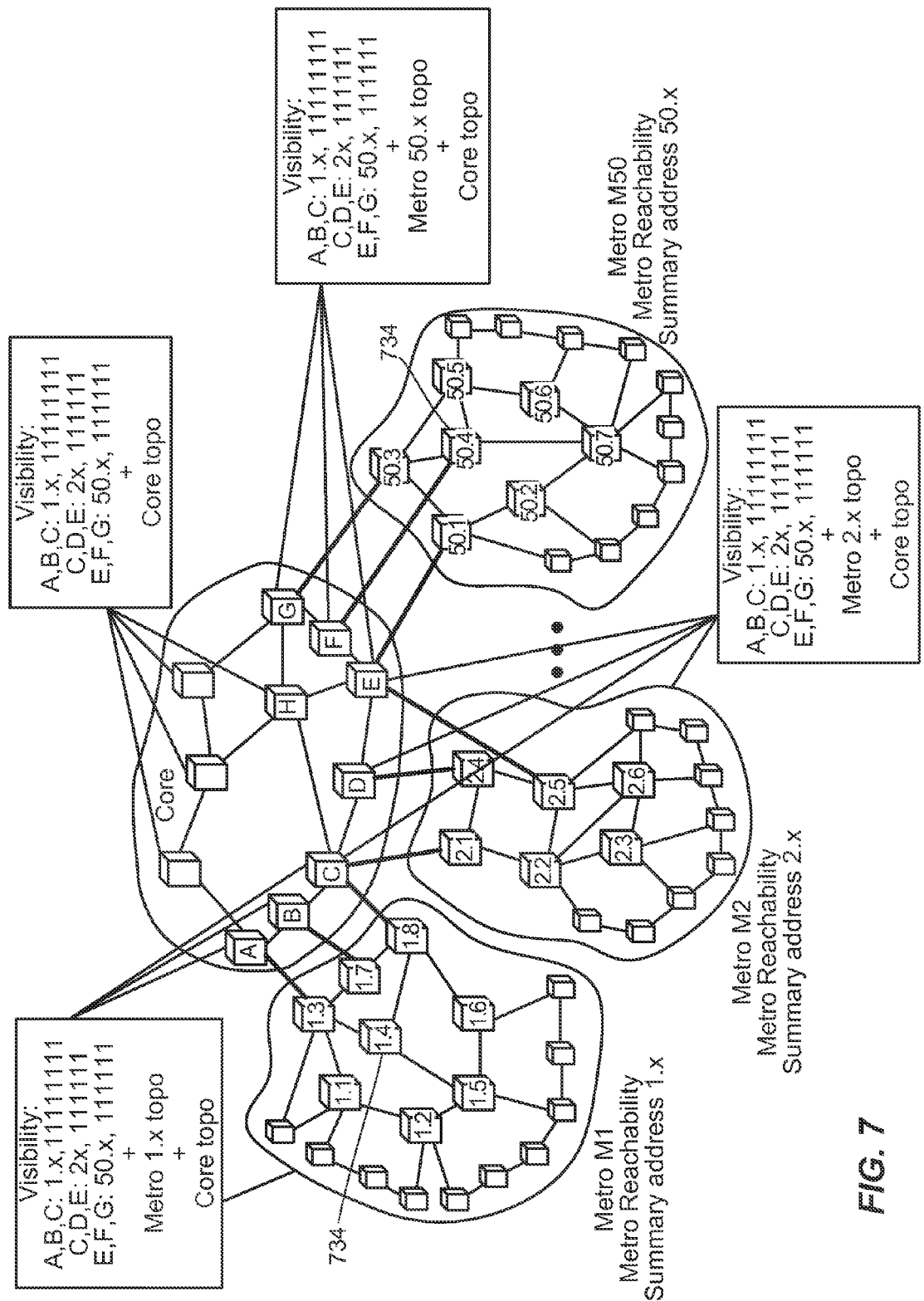
FIG. 7 depicts an exemplary embodiment showing visibility of a node.

FIG. 7 depicts an exemplary embodiment. For example, the visibility of a node is shown in FIG. 7. By way of illustration, an example of SNC from 1.4 to 50.2 will now be described. This example assumes the most simple of implementations where a Metro Reachability Bit Vector is advertized/flooded with a single bit representing reachability/non-reachability to a Metro Node 734. Steps:

User issues ENT-SNC against source Metro Node 734 (1.4)
ENT-SNC::SNC-1-1:C:::RMTNODE="50.2", . . . ;
Optical Signaling and Routing Protocol (OSRP) calculates a route to destination node 50.2
On source Metro Node 1.4 OSRP determines that nodes E, F, G can reach 50.2 so it calculates routes to each and chooses the "best" one.
Assume the route is via node E:
DTL={<1.4,link>, <1.8,link>, <C,link>, <D,link>, <E,0>}
Note that route through E may not be the best end-to-end route but with Metro Reachability Bit Vector with only a single bit, this may be the consequence. More bits may be used to indicate some level of cost, e.g.: high, medium, low.
OSRP signals SNC with the computed DTL and destination of 50.2
SNC SETUP arrives at node E (final hop in the DTL) where OSPR determines E is not the final destination so it calculates a route from E to destination 50.2 and extends the DTL. Assume the extended DTL is:
DTL={<1.4,link>, <1.8,link>, <C,link>, <D,link>, <E, link>, <50.1,link>, <50.2,0>}
SNC SETUP is allowed to continue along the DTL and arrives at destination Metro Node 50.2 and CONNECT is launched back to source Metro Node 1.4
SNC setup completes once the CONNECT is received by source Metro Node 1.4

Another example will now be described wherein a metro reachability bit vector is not advertized/flooded. If a Metro Reachability Bit Vector is not advertized/flooded then a PCE type of mechanism may be utilized to perform path computations. The following are the steps for SNC setup from Metro Node 1.4 to 50.2 using a Backward Recursive PCE (BR-PCE):

User issues ENT-SNC against source Metro Node 1.4
ENT-SNC::SNC-1-1:C:::RMTNODE="50.2", . . . ;
OSRP uses BR-PCE to calculate a route to destination node 50.2 as follows:
On source Metro Node 1.4 OSRP determines that nodes E,F,G can reach 50.2 so it sends a BR-PCE request to either E,F,G to calculate a "best" route from E,F,G to 50.2. Assume 1.4 chooses E and sends the BR-PCE request to it
On Home Node E OSRP calculates "best" routes from each of E,F,G to 50.2. Assume the "best" routes are as follows:
$DTL_{E->50.2}$={<E,link>,<50.1,link>,<50.2,0>} at cost of 30
$DTL_{E->50.2}$={<F,link>,<50.4,link>,<50.7,link>, <50.2,0>} at cost of 50
$DTL_{G->50.2}$={<G,link>,<50.3,link>,<50.1,link>, <50.2,0>} at cost of 60
Home Node E returns the routes $DTL_{E->50.2}$, $DTL_{F->50.2}$, $DTL_{G->50.2}$ back to source Metro Node 1.4 as part of BR-PCE reply
On source Metro Node 1.4 OSRP calculates best routes to each of E, F, G. Assume the best routes are as follows:
$DTL_{1.4->E}$={<1.4,link>,<1.8,link>,<C,link>,<D, link>,<E,0>} at cost of 100
$DTL_{1.4->F}$=<1.4,link>,<1.8,link>,<C,link>,<H, link>,<E,link>, <F,0>} at cost of 130
$DTL_{1.4->G}$={<1.4,link>,<1.8,link>,<C,link>,<H, link>,<G,0>} at cost of 80
Metro Node 1.4 now combines the best routes $DTL_{1.4->E}$, $DTL_{1.4->F}$, $DTL_{1.4->G}$ with corresponding best routes $DTL_{E->50.2}$, $DTL_{F->50.2}$, $DTL_{G->50.2}$ to obtain the end-to-end best route from 1.4 to 50.2;

$DTL_{1.4 \to 50.2} = DTL_{1.4 \to E}$ and $DTL_{E \to 50.2} = \{<1.4,\text{link}>, <1.8,\text{link}>, <C,\text{link}>, <D,\text{link}>, <E,\text{link}>, <50.1,\text{link}>, <50.2,0>\}$ at a cost of $100+30=130$ OSRP signals SNC with the computed $DTL_{1.4 \to 50.2}$ Note that the described PCE mechanism may be in-skin and its topology database may be OSRP's routing database, i.e. PCE is a component riding on top of OSRP routing and PCE communication (request+reply) may be done OOB or IB.

Figure 8A:
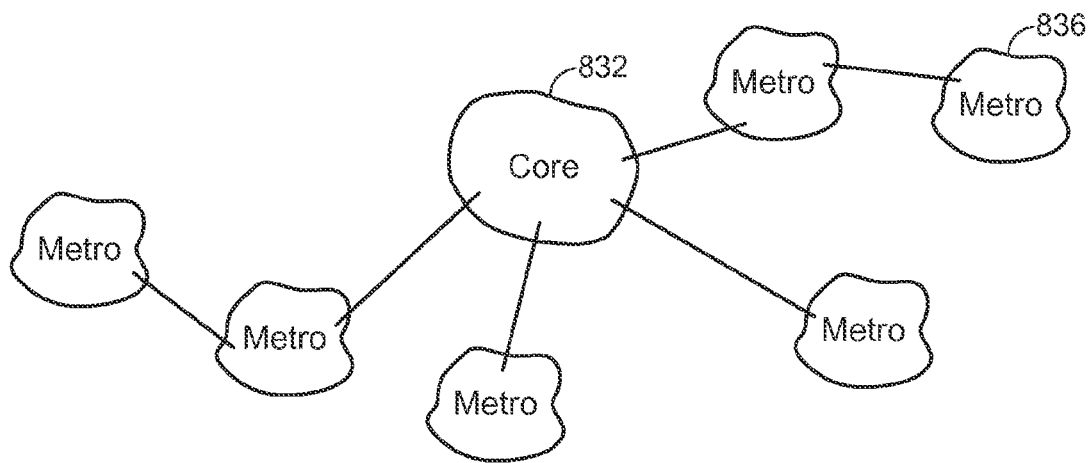
FIGS. 8A and B depict an exemplary embodiment of a hierarchical metro architecture.
Figure 8B:
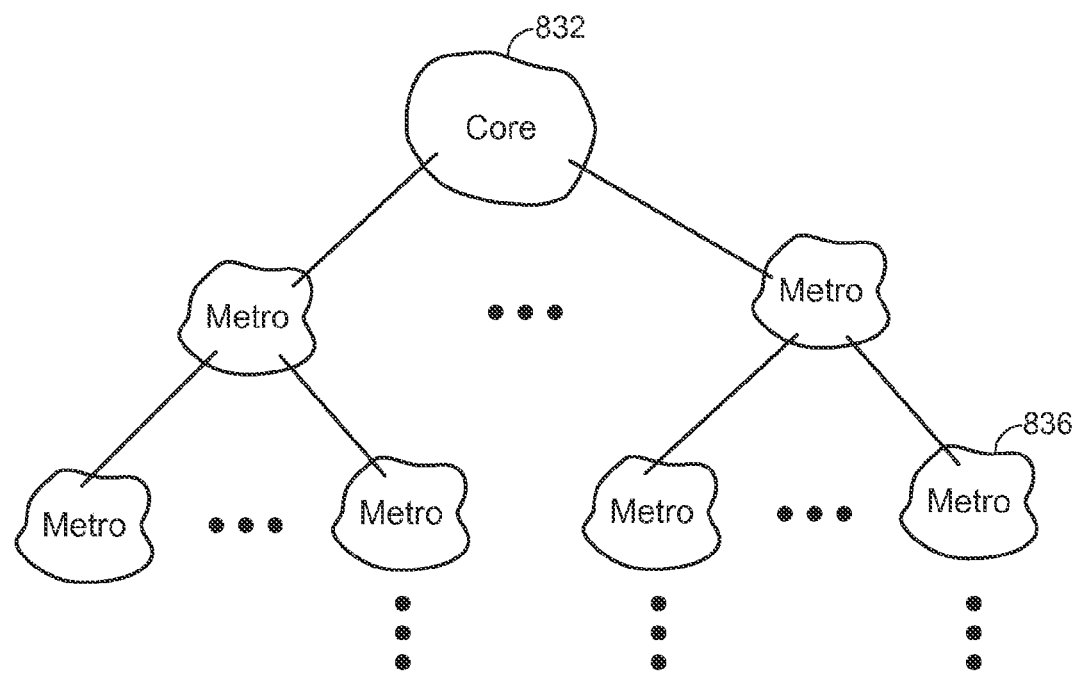

FIGS. 8A and B depict an exemplary embodiment. For example, a hierarchical metro architecture is shown in FIGS. 8A and B. There may be a desire to deploy metros in a hierarchical way when not all metros are connected to a core, i.e. when more than one metro may need to be traversed to get to another metro via a core. For example, core 832 may be connected to a plurality of metro networks 836 as shown in FIG. 8A. Such configurations can be generically thought of as a hierarchy where the core is the root as shown in FIG. 8B.

Figure 9:
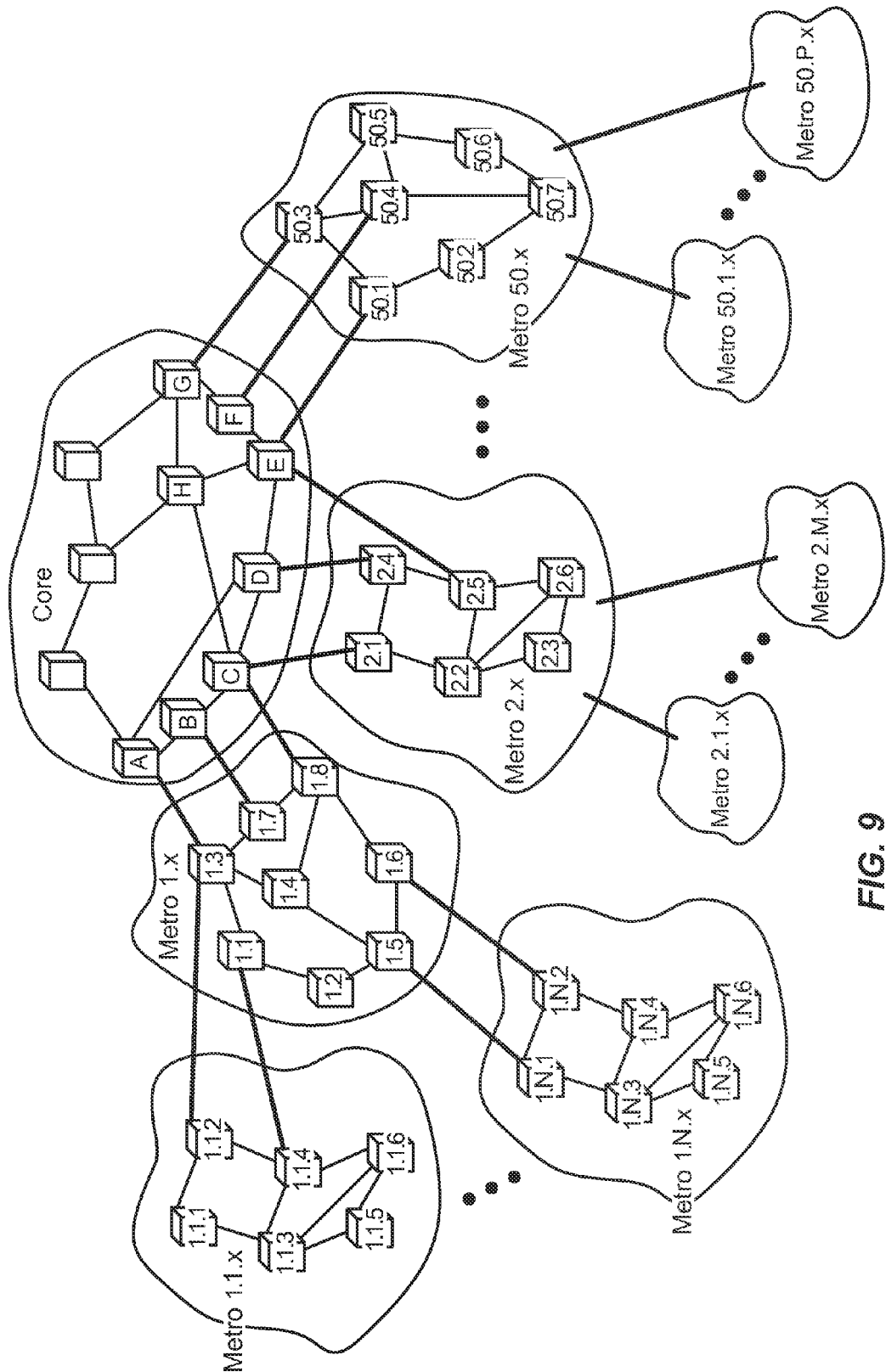
FIG. 9 depicts an exemplary embodiment of a two level hierarchical architecture.
Figure 10:
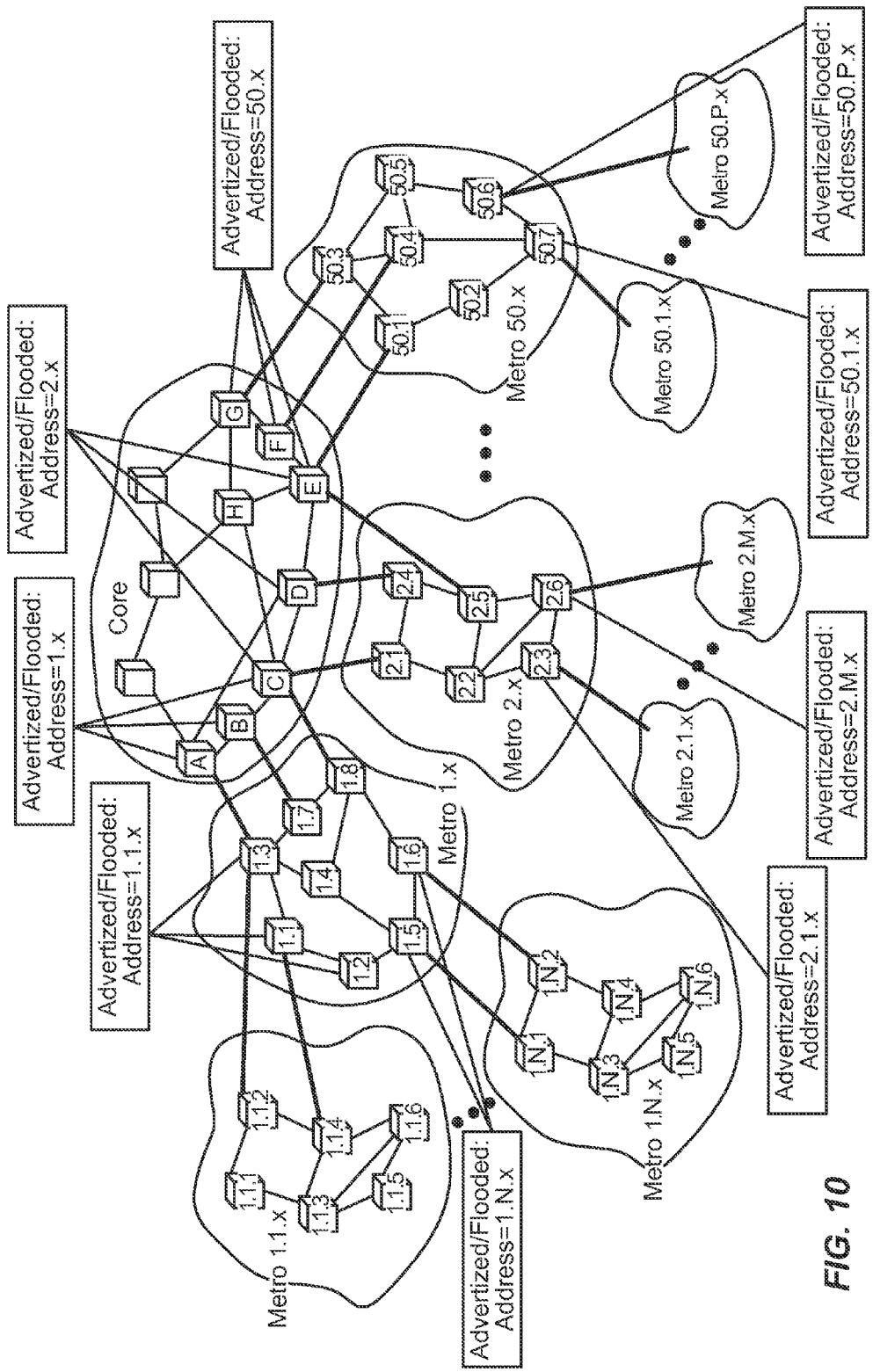
FIG. 10 depicts an exemplary embodiment of a two level Hierarchical Metro Reachability architecture.
Figure 11:
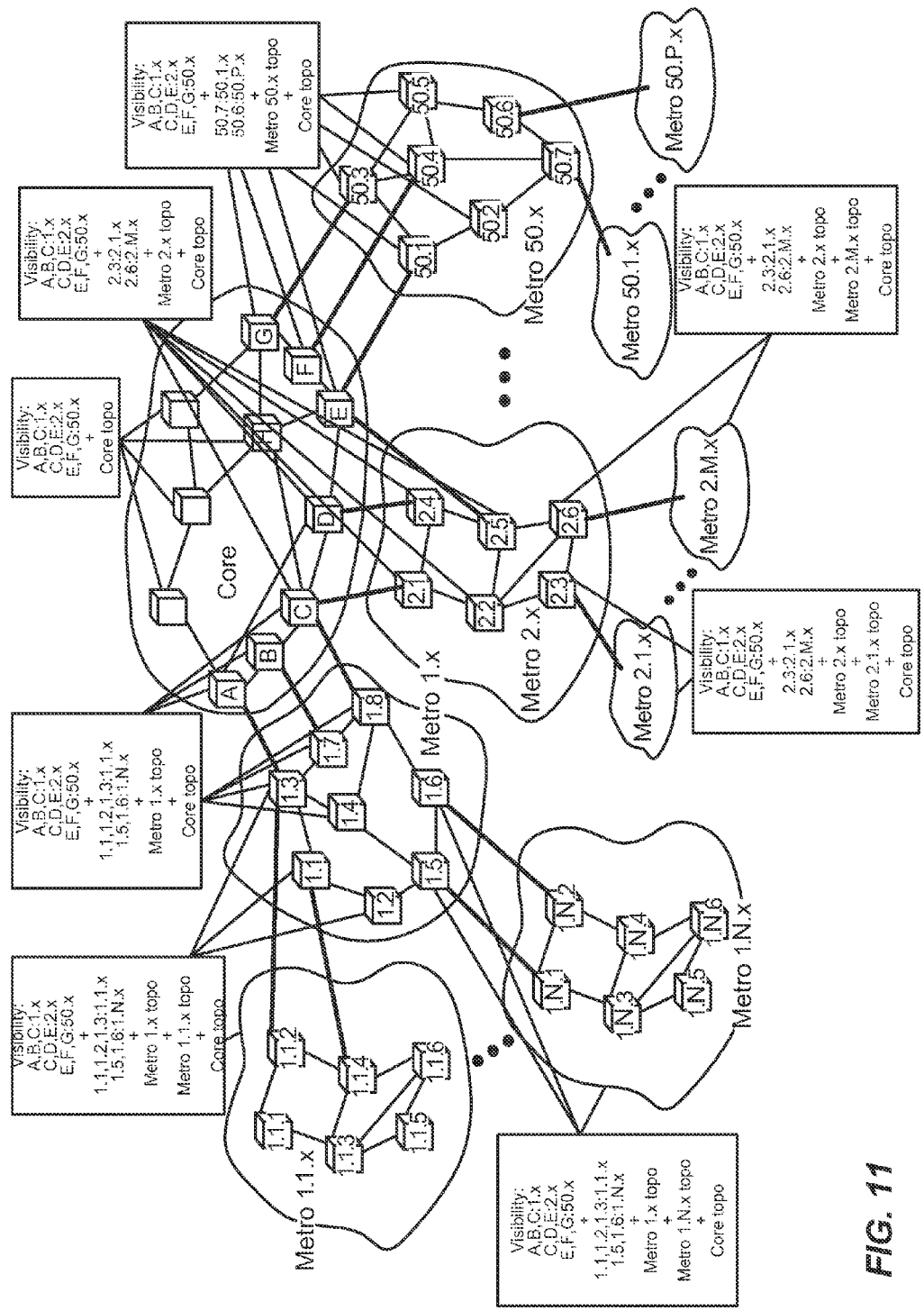
FIG. 11 depicts an exemplary embodiment of a two level Hierarchical Visibility architecture.

FIG. 9 depicts an exemplary embodiment. For example, a two level hierarchical architecture with core and metro networks is shown in FIG. 9. FIG. 10 depicts an exemplary embodiment. For example, a two level Hierarchical Metro Reachability architecture is shown in FIG. 10. FIG. 11 depicts an exemplary embodiment. For example, two level Hierarchical Visibility architecture is shown in FIG. 11.

With reference to FIG. 11, by way of illustration, an example of SNC from 2.M.x to 1.1.3 will now be described.

User issues ENT-SNC against source Metro Node 2.M.x
ENT-SNC::SNC-1-1:C:::RMTNODE="1.1.3", ... ;

OSRP uses PCE to calculate a route to destination node 1.1.3 as follows:

On source Metro Node 2.M.x OSRP determines that nodes A, B, C can reach 1.1.3 so it sends a BR-PCE request to either A,B,C to calculate a route from A,B,C to 1.1.3. Assume 2.M.x chooses A and sends the BR-PCE request to it On Home Node A OSRP determines that nodes 1.1,1.2, 1.3 can reach 1.1.3 so it sends a BR-PCE request to either 1.1,1.2,1.3 to calculate a route from 1.1,1.2,1.3 to 1.1.3. Assume A chooses 1.1 and sends the BR-PCE request to it On Home Node 1.1 OSRP calculates "best" routes from each of 1.1,1.2,1.3 to 1.1.3. Assume the "best" routes are as follows:

$DTL_{1.1 \to 1.1.3} = \{<1.1,\text{link}>, <1.1.4,\text{link}>, <1.1.3,0>\}$ at cost of 30

$DTL_{1.2 \to 1.1.3} = \{<1.2,\text{link}>, <1.1.4,\text{link}>, <1.1.3,0>\}$ at cost of 20

$DTL_{1.3 \to 1.1.3} = \{<1.3,\text{link}>, <1.1.2,\text{link}>, <1.1.1,\text{link}>, <1.1.3,0>\}$ at cost of 60

Home Node E returns the routes $DTL_{1.1 \to 1.1.3}$, $DTL_{1.2 \to 1.1.3}$, $DTL_{1.3 \to 1.1.3}$ back to Home Node A as part of BR-PCE reply On Home Node A OSRP calculates "best" routes from each of A,B,C through 1.1,1.2,1.3 to 1.1.3 considering the routes $DTL_{1.1 \to 1.1.3}$, $DTL_{1.3 \to 1.1.3}$ received in BR-PCE reply. Assume the "best" routes are as follows:

$DTL_{A \to 1.1.3} = \{<A,\text{link}>, <1.3,\text{link}>, <1.1.\text{link}>, <1.1.4, \text{link}>, <1.1.3,0>\}$ at cost of 70

$DTL_{B \to 1.1.3} = \{<B,\text{link}>, <1.7,\text{link}>, <1.3,\text{link}>, <1.1, \text{link}>, <1.1.4,\text{link}>, <1.1.3,0>\}$ at cost of 90

$DTL_{C \to 1.1.3} = \{<C,\text{link}>, <1.8,\text{link}>, <1.6,\text{link}>, <1.5, \text{link}>, <1.2,\text{link}>, <1.1.4,\text{link}>, <1.1.3,0>\}$ at cost of 100

Home Node A returns the routes $DTL_{A \to 1.1.3}$, $DTL_{C \to 1.1.3}$ back to source Metro Node 2.M.x as part of BR-PCE reply On source Metro Node 2.M.x OSRP calculates "best" routes to 1.1.3 through A,B,C considering the routes $DTL_{A \to 1.1.3}$, $DTL_{B \to 1.1.3}$, $DTL_{C \to 1.1.3}$ received in BR-PCE reply. Assume the "best" routes are as follows:

$DTL_{2.Mx \to A \to 1.1.3} = \{<2.M.x,\text{link}>, <2.6,\text{link}>, <2.5, \text{link}>, <2.4,\text{link}>, <D,\text{link}>, <A,\text{link}>, <1.3,\text{link}>, <1.1.\text{link}>, <1.1.4,\text{link}>, <1.1.3,0>\}$ at cost of 170

$DTL_{2.Mx \to B \to 1.1.3} = \{<2.M.x,\text{link}>, <2.6,\text{link}>, <2.5, \text{link}>, <2.4,\text{link}>, <D,\text{link}>, <A,\text{link}>, <B,\text{link}>, <1.7, \text{link}>, <1.3,\text{link}>, <1.1,\text{link}>, <1.1.4,\text{link}>, <\mathbf{1.1.3,0}>\}$ at cost of 200

$DTL_{2.Mx \to C \to 1.1.3} = \{<2.M.x,\text{link}>, <2.6,\text{link}>, <2.2, \text{link}>, <2.1,\text{link}>, <C,\text{link}>, <1.8,\text{link}>, <1.6,\text{link}>, <1.5,\text{link}>, <1.2,\text{link}>, <1.1.4,\text{link}>, <1.1.3,0>\}$ at cost of 150

Metro Node 2.M.x chooses the "best" route from 2.M.x to 1.1.3 via C, i.e. $DTL_{2.Mx \to C \to 1.1.3}$:

$DTL_{2.Mx \to 1.1.3} = \{<2.M.x,\text{link}>, <2.6,\text{link}>, <2.2,\text{link}>, <2.1,\text{link}>, <C,\text{link}>, <1.8,\text{link}>, <1.6,\text{link}>, <1.5, \text{link}>, <1.2,\text{link}>, <1.1.4,\text{link}>, <1.1.3,0>\}$ at cost of 150

OSRP signals SNC with the computed $DTL_{2.Mx \to 1.1.3}$

A number of options may be available for hierarchical network structures. For example, BR-PCE may be used to calculate the end-to-end route if the destination node is not in the source node's topology database. Also, the number of recursions may depend on the hierarchical level of metros, i.e. N-level hierarchy->(N-1) recursions. Also, Metro reachability information (Metro Reachability Summary Address) may be explicitly provisioned on Home Nodes leading to a metro or dynamically discovered via OSRP routing. Also, the outermost metro (from perspective of the core) may always have the largest view in terms of the network topology. The Core may have the smallest view and may only know which Home Nodes can reach which metros. This may be beneficial as the core may be busy processing all control plane signaling messages resulting from mesh restorations, etc. This processing may require a processor and thus not over-burdening the core with routing details may be beneficial. The further away from a core, i.e. metros, the less processor time may be required for control plane signaling (less connections) and thus more processor time may be afforded to handling routing details/updates. In addition, metro-to-metro shortcuts may be used. In addition, multiple levels of "tails" and metros may be used.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for management of communications networks. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for resource and connection management in a hierarchical network having an upper level domain and at least one lower level domain in communication with the upper level domain, the method comprising:
   designating a first set of control-plane enabled nodes of the upper domain as upper nodes, each upper node being operable to route traffic between a pair of neighbor upper nodes in the upper domain;
   designating a second set of control-plane enabled nodes of a lower domain as lower nodes, each lower node being operable to route traffic between a pair of neighbor lower nodes in the lower domain, wherein each upper node being operable to route traffic to a lower node and each lower node being operable to route traffic to an upper node;
   designating one of the upper nodes that is connected to one of the lower nodes as a host node;
   assigning summary information to the lower domain and each lower node in the lower domain;
   advertising the summary information to the lower nodes in the network; and
   advertising the summary information to the upper nodes in the network.

2. The method of claim 1, wherein the host node advertises the summary information.

3. The method of claim 1, wherein the host node is controlled to propagate link state messages received from other upper nodes to the connected lower node.

4. The method of claim 1, wherein the host node is controlled to prevent propagation of link state messages received from the connected lower node to other upper nodes.

5. The method of claim 1, wherein the summary information comprises a summary address for each lower node, the summary address being different than an actual address of the lower node.

6. The method of claim 1, further comprising:
   a source node in a first lower level domain determining at least one host node in the upper domain that may reach a destination node in a second lower level domain different from the first lower level domain;
   requesting the at least one host node to calculate a path to the destination node from each determined at least one host node;
   the at least one host node calculating possible paths;
   the at least one host node sending the calculated possible paths to the source node;
   the source node determining a cost of routing from the source node to the destination node along the received calculated possible paths for each of the calculated possible paths; and
   the source node selecting one of the calculated possible paths based on the determined cost of routing for all the calculated possible paths.

7. The method of claim 1, wherein the summary information comprises a connectivity vector.

8. The method of claim 7, wherein the connectivity vector comprises a binary sequence, each bit position of the binary sequence representing a respective one of the lower nodes attached to the host node, and a respective binary value of each bit position representing whether or not the respective lower node can be reached through the host node.

9. The method of claim 7, wherein the connectivity vector comprises a binary sequence including a respective set of two or more bit positions for each lower node attached to the host node, and wherein a respective binary value of each set of bit positions represents information regarding connectivity between the host node and the respective lower node.

10. The method of claim 9, wherein the information regarding connectivity between the host node and the respective lower node comprises an available bandwidth for connections to the lower node.

11. In a hierarchical network having a transport plane for carrying traffic within end-to-end connections and a control plane for managing at least a portion of resources of the transport plane allocated to the connections, a network node for extending the control plane to a network edge, the network node comprising:
   at least one interface to a set of control-plane enabled upper nodes of the network, each upper node being operable to route traffic between a pair of neighbor upper nodes in the network;
   at least one interface to a set of control-plane enabled lower nodes of the network, the set of lower nodes operating as a sub-domain of the network; and
   the network node being configured to advertise summary information of its connected lower nodes to other upper nodes in the network.

12. The network node as claimed in claim 11, wherein the network node is controlled to propagate link state messages received from other upper nodes to its connected lower nodes.

13. The network node as claimed in claim 11, wherein the network node is controlled to prevent propagation of link state messages received from connected lower nodes to other upper nodes.

14. The network node as claimed in claim 11, wherein the summary information comprises a connectivity vector.

15. The network node as claimed in claim 14, wherein the connectivity vector comprises a binary sequence, each bit position of the binary sequence representing a respective one of the lower nodes attached to the network node, and a respective binary value of each bit position representing whether or not the respective lower node can be reached through the network node.

16. The network node as claimed in claim 11, wherein the summary information comprises a summary address.

17. The network node as claimed in claim 16, wherein the summary address comprises a respective area identifier uniquely identifying a set of one or more lower nodes connected to the network node.

18. The network node as claimed in claim 17, wherein the area identifier is derived from a network address of the network node.

19. The network node as claimed in claim 17, wherein the area identifier is derived from network addresses of the set of one or more lower nodes.

20. The network node as claimed in claim 11, wherein the summary information comprises a connectivity vector having a binary sequence including a respective set of two or more bit positions for each lower node attached to the host node, and wherein a respective binary value of each set of bit positions represents information regarding connectivity between the host node and the respective lower node.

* * * * *